March 1, 1960  G. W. PAINTER  2,926,881
RESILIENT MOUNTING
Filed April 10, 1958

INVENTOR.
Giles W. Painter
BY Ralph Hammer
Attorney

United States Patent Office 2,926,881
Patented Mar. 1, 1960

2,926,881

RESILIENT MOUNTING

Giles Warren Painter, Erie, Pa., assignor to Lord Manufacturing Company, Erie, Pa., a corporation of Pennsylvania Application April 10, 1958, Serial No. 727,676

8 Claims. (Cl. 248—358)

This invention is a resilient mounting in which the supporting and supported members are angularly related to each other. In a preferred form, one of the members is a plate with an opening therein and the other of the members extends axially through the opening. The load between the members is carried by a body of rubber bonded to and bridging the space between the members. Embedded in the rubber body is a floating member having a flange spaced above the plate and having a tubular section at the center opposite and spaced inward from the edge of the opening in the plate. The floating member increases the ability of the mounting to absorb shock loads, particularly in a radial direction, and also controls the ratio of axial to radial stiffness of the mounting.

Figure 1:
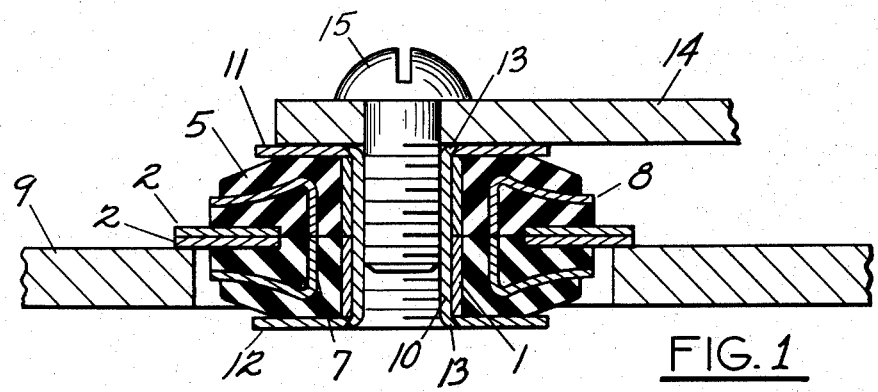
Figure 2:
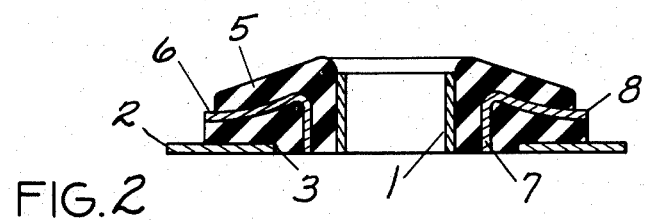
Figure 3:
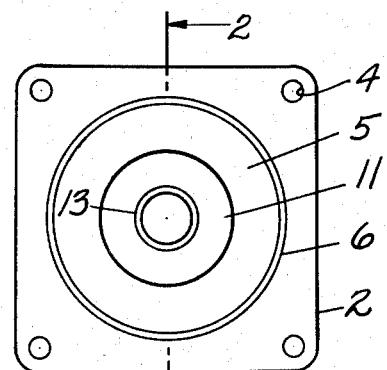

In the drawing, Fig. 1 is a section through a mounting installation, Fig. 2 is a section through one of the mountings, on line 2—2 of Fig. 3, and Fig. 3 is a top plan view of the Fig. 2 mounting.

The mounting has supporting and supported members 1 and 2, 1 being a sleeve and 2 being a plate with an opening 3 at its center part. The plate may be of any suitable shape, for example square, with attaching holes 4 at the corners. Bridging the space between the members 1 and 2 is a body 5 of natural or synthetic rubber bonded to the outer surface of the sleeve 1 and to the upper surface of the plate 2 and to the inner edge of the opening 3. The rubber body forms the load carrying connection between the supporting and supported members. The parts so far described are or may be of common construction and may vary substantially in dimensions and shape.

Between and in spaced relation to both the supporting and supported members 1 and 2 is a floating member 6 embedded in and bonded to the body 5. The purpose of the floating member is to increase the ability of the mounting to stand shock loads and to control the ratio of axial to radial stiffness. The floating member has a center sleeve 7 of larger diameter than the sleeve 1 and of lesser diameter than the opening 3 located midway between the sleeve and the inner edge of the opening. At the upper end of the sleeve 7 is a radially extending flange 8 spaced above the upper surface of the plate 2 and substantially midway between the top and bottom of the rubber body 5. Radial loads are transmitted between the members 1 and 2 partly in shear between the flange 8 and the upper side of the plate 2 and partly in direct stress between the sleeve 7 and the sleeve 1 and the inner edge of the opening 3. The flange 6 from one aspect prevents stress concentration at the inner edge of the opening 3 by distributing the radial stress over the upper surface of the plate 2. Axial loads between the supporting and supported members 1 and 2 are taken by a combination of shear and direct stress of the rubber body. The shear stress is between the sleeve 1 and the sleeve 7 and the inner edge of the opening 3 while the direct stress, i.e. tension or compression as distinguished from shear, is between the flange 6 on the upper surface of the plate 2.

In the mounting installation of Fig. 1, two of the mountings are arranged back to back with their plates 2 fixed to each other to form a composite plate suitably secured to a supporting structure 9. Extending through the sleeve 1 is an internally threaded sleeve 10 having its upper and lower ends 13 spun over washers 11 and 12 at the upper and lower ends of the sleeves 1. When the ends of the sleeve 10 are spun over as indicated at 13, the abutting ends of the sleeves 1 are clamped solidly against each other and the sleeves 1 and 10 and the washers 11 and 12 are fixed together as a rigid structural unit. Likewise the sleeves 7 of the floating members are clamped end to end endwise against each other so that the two floating members form in effect a single spool shaped member with the body of the spool opposite the edge of the opening in the plate and with the flanges of the spool embracing the upper and lower surfaces of the plate. The device 14 to be supported by the mounting system is attached by a screw 15 which clamps the supported device against the washer 11.

The mounting installation of Fig. 1 is fully safetied for loads in all directions because the washers 11 and 12 are of larger diameter than the opening 3. Deterioration of the rubber body 5 will, of course, impair the vibration isolation characteristics but the supported device 14 will always be connected to the supporting structure 9. Axial loads are taken in shear between the axially extending surfaces of the mounting and in compression between the radially extending surfaces. Radial loads are taken in shear between the radially extending surfaces of the mounting and in compression between the axially extending surfaces. Since the mounting as explained above has both radially and axially extending surfaces, it is possible to control the ratio of axial to radial stiffness by balancing the dimensions of the radial and axial surfaces. The floating member 6 plays an important part in balancing the radial and axial stiffness of the mounting as well as in preventing stress concentration at the inner edge of the opening 3.

Both the supporting and supported members have extended surfaces in angular relation to each other, namely the axial or outer surface on the sleeve 1 and the radial surface around the opening 3 in the plate 2. The floating member likewise has extended surfaces in angular relation to each other, namely the radially extending surfaces of the flange 8 and the axially extending surfaces of the sleeve 7. The floating member acts to distribute forces over the extended surfaces of the supporting and supported members, thereby avoiding stress concentration in the rubber. For example, in the absence of the floating member, both radial and axial forces would be concentrated at the edge of the opening 3. The floating member intercepts forces which would tend to concentrate at the edge of the opening and distributes those forces over the extended surface on the plate 2 around the opening.

What is claimed as new is:

1. A resilient mounting comprising supporting and supported members, one member being a plate with an opening therein and the other member having a sleeve of diameter smaller than the opening extending from above the plate axially to the opening, an annular body of rubber of larger diameter than said opening bonded to the sleeve and to the plate around said opening, and a floating member embedded in and bonded to said body between said supporting and supported members with portions of said body separating the floating member from said supporting and supported members, said floating member having a radially extending flange of larger diameter than said opening spaced axially above the plate and transmitting radial and axial forces to the plate respectively through shear and direct stress on the rubber separating the plate and flange, and said floating member having an axially extending tubular section of diameter less than said opening and larger than said sleeve receiving radial and axial forces from said sleeve respectively through direct stress and shear on the rubber separating the tubular section from said sleeve.

2. A resilient mounting comprising supporting and supporting and supported members, one member being a plate with an opening therein and the other member extending from above the plate axially through the opening to below the plate, an annular body of rubber of larger diameter than said opening bonded between said members, and having a portion embedding the edge of the plate around said opening, and a spool shaped floating member embedded in said body between said supporting and supported members, said floating member having radially extending upper and lower flanges of larger diameter than said opening spaced above and below the plate and transmitting radial and axial forces to the plate respectively through shear and direct stress on the rubber between the plate and flange, and said floating member having an axially extending tubular section of diameter less than said opening and larger than said other member receiving radial and axial forces from said other member respectively through direct stress and shear on the rubber between the tubular section and said other member.

3. A resilient mounting comprising supporting and supported members, one member being a plate with an opening therein and the other member having a section of diameter smaller than the opening extending from above the plate axially to within the opening, an annular body of rubber of larger diameter than said opening fixed in load carrying relation between said members and having a portion resting on the plate around said opening, and a floating member embedded in said body between said supporting and supported members, said floating member having a radially extending flange of larger diameter than said opening spaced above the plate and transmitting radial and axial forces to the plate respectively through shear and direct stress on the rubber between the plate and flange, and said floating member having an axially extending tubular section of diameter less than said opening and larger than said section of said other member receiving radial and axial forces from said other member respectively through direct stress and shear on the rubber between the tubular section and said other member.

4. A resilient mounting comprising supporting and supported members, one member being a plate with an opening therein and the other member having a section of diameter smaller than the opening extending from above the plate axially to within the opening, an annular body of rubber of larger diameter than said opening fixed in load carrying relation between said members and having a portion resting on the plate around said opening, and a floating member embedded in said body between said supporting and supported members, said floating member having both radially and axially extending surfaces, the radially extending surfaces being spaced axially above the plate and radially from said other member and the axially extending surfaces being spaced radially from said other member and from the peripheral edge of the opening, the radially extending surfaces transmitting radial and axial forces to the plate respectively through shear and direct stress on the rubber, and axially extending surfaces receiving radial and axial forces from said other member respectively through direct stress and shear on the rubber.

5. A resilient mounting comprising supporting and supported members, one member being a plate with an opening therein and the other member having a section of diameter smaller than the opening extending from above the plate axially to within the opening, an annular body of rubber of larger diameter than said opening fixed in load carrying relation between said members and having a portion resting on and bonded to the plate around said opening, and a floating member embedded in and bonded to said body between said supporting and supported members, said floating member having a radially extending flange of larger diameter than said opening spaced above the plate and transmitting radial and axial forces to the plate respectively through shear and direct stress on the rubber between the plate and flange, and said floating member having an axially extending tubular section of diameter less than said opening and larger than said section of said other member receiving radial and axial forces from said other member respectively through direct stress and shear on the rubber between the tubular section and said other member.

6. A resilient mounting comprising supporting and supported members, one member being a plate with an opening therein and the other member having a section of diameter smaller than the opening lying within the projected area of the opening and extending from above the plate axially to the plane of the opening, an annular body of rubber of larger diameter than said opening fixed in load carrying relation between said members and having a portion resting on the plate around said opening, and a floating member embedded in said body between and spaced from said supporting and supported members, said floating member having walls of angular radial section with a part extending radially over the plate and with an angularly related part extending axially along said section of the other member, the radially extending part of said floating member transmitting radial and axial forces to the plate respectively through shear and direct stress on the rubber, and the axially extending part of said floating member receiving radial and axial forces from said section of said other member respectively through direct stress and shear on the rubber.

7. A resilient mounting comprising spaced supporting and supported members each member having an extended surface in angular relation to an extended surface on the other member, a body of rubber bridging the space between said surfaces and in load transmitting relation thereto, and a floating member embedded in the rubber between and in spaced relation to both of said supporting and supported members and with portions of said body of rubber separating the floating member from each of the supporting and supported members, said floating member having surfaces in angular relation to each other, one of the angularly related surfaces on the floating member extending along and spaced from said extending surface on the supported member and the other of the angularly related surfaces on the floating member extending along and spaced from said extended surface on the supported member.

8. A resilient mounting comprising spaced supporting and supported members each having an extended surface in angular relation to an extended surface on the other member, one of the members being a plate having an edge presented to and spaced from said extended surface on the other of the members, a body of rubber bridging the space between said extended surfaces and in load transmitting relation thereto and embedding said edge of the plate, and a floating member embedded in the rubber between and in spaced relation to said members, said floating member having surfaces in angular relation to each other, one of the angularly related surfaces on the floating member extending along and spaced from the plate and the other of angularly related surfaces of the floating member being opposite said edge of the plate and extending along and spaced from said extended surface of the other of the members.

References Cited in the file of this patent

UNITED STATES PATENTS

| | | |
|---|---|---|
| 1,834,450 | Flinterman | Dec. 1, 1931 |
| 2,068,279 | Piron | Jan. 19, 1937 |